United States Patent
Dittmar

(10) Patent No.: US 8,585,026 B2
(45) Date of Patent: *Nov. 19, 2013

(54) BIFURCATED SPRING SYSTEM WITH STRAIN CONTROL CAMS

(76) Inventor: Edbert E. L. Dittmar, Post Falls, ID (US)

( * ) Notice: Subject to any disclaimer, the term of this patent is extended or adjusted under 35 U.S.C. 154(b) by 167 days.

This patent is subject to a terminal disclaimer.

(21) Appl. No.: 12/838,273

(22) Filed: Jul. 16, 2010

(65) Prior Publication Data

US 2011/0101583 A1     May 5, 2011

Related U.S. Application Data

(63) Continuation of application No. 10/946,279, filed on Sep. 21, 2004, now Pat. No. 7,789,378.

(51) Int. Cl.
*A47C 1/02*     (2006.01)
*F16F 1/18*     (2006.01)

(52) U.S. Cl.
USPC ..................................... 267/160; 297/302.1

(58) Field of Classification Search
USPC .......... 267/36.1, 47, 260, 262, 263, 158–160, 267/41; 248/591, 628, 629, 630; 297/268.1, 297/196, 198, 302.1; 280/124.163, 124.174
See application file for complete search history.

(56) References Cited

U.S. PATENT DOCUMENTS

| | | | |
|---|---|---|---|
| 1,433,246 A | 10/1922 | Tacchi | |
| 1,998,508 A | 4/1935 | Kappenberg | |
| 2,378,499 A | 6/1945 | Rapp | |
| 2,434,783 A | 1/1948 | Athey | |
| 2,440,172 A | 4/1948 | Gibbons | |
| 3,465,997 A | 9/1969 | Piske | |
| 3,499,660 A * | 3/1970 | Raidel | 280/682 |
| 3,685,812 A * | 8/1972 | Buchesky et al. | 267/47 |
| 4,129,290 A | 12/1978 | Popper | |
| 4,340,250 A | 7/1982 | Ward | |
| 4,371,189 A * | 2/1983 | Raidel | 280/682 |
| 4,538,882 A | 9/1985 | Tanaka et al. | |
| 4,801,019 A | 1/1989 | Smolen, Jr. | |
| 5,209,518 A | 5/1993 | Heckenliable et al. | |
| 5,222,709 A | 6/1993 | Culley, Jr. et al. | |
| 5,481,078 A * | 1/1996 | Asche | 200/85 A |
| 5,505,521 A | 4/1996 | Meiller et al. | |
| 5,975,633 A | 11/1999 | Walk et al. | |
| 6,298,795 B1 | 10/2001 | Suer | |
| 6,361,026 B2 | 3/2002 | Reast | |
| 7,789,378 B2 * | 9/2010 | Dittmar | 267/160 |
| 2001/0013676 A1 * | 8/2001 | Reast | 267/47 |
| 2003/0168788 A1 | 9/2003 | Hon | |

FOREIGN PATENT DOCUMENTS

| | | |
|---|---|---|
| CN | 227772 | 3/2002 |
| DE | 878132 | 6/1953 |
| DE | 019809908 | 9/1999 |

(Continued)

*Primary Examiner* — Christopher Schwartz
(74) *Attorney, Agent, or Firm* — Thorpe North & Western LLP

(57) ABSTRACT

A spring system comprising flat plate-springs with one end mounted rigidly to an un-spring first base and the opposite end mounted rigidly to a sprung second base. The spring system is fitted with cams as strain-control surfaces, mounted tangent to the plate springs and spaced progressively from the said plate-springs beginning at the tangency. The strain-control cams are movable to provide for adjustable spring rates, actively repositioned upon demand therein providing an adaptive active spring-rate system or suspension.

22 Claims, 3 Drawing Sheets

(56) References Cited

FOREIGN PATENT DOCUMENTS

| | | |
|---|---|---|
| GB | 2238840 | 6/1991 |
| JP | 1-144222 | 6/1989 |
| JP | 7-302417 | 11/1995 |
| JP | 2000-258332 | 9/2000 |
| SU | 614984 | 7/1978 |
| SU | 838167 | 6/1981 |

\* cited by examiner

BIFURCATED SPRING SYSTEM WITH STRAIN CONTROL CAMS

CLAIM OF PRIORITY

This application is a continuation of and claims priority to application Ser. No. 10/946,279 filed on Sep. 21, 2004, which is incorporated herein by reference.

FIELD OF INVENTION

The present invention pertains to the field of constrained path plate-spring spring systems, or suspensions, in which a sprung portion of a mass is connected to an unsprung portion of the said mass, by means of a resilient flat wide spring mechanism. This invention will find application in constrained path mechanical shock and vibration isolation spring mechanisms and suspensions.

SUMMARY OF INVENTION

This object is achieved with a bifurcated plate-spring system with strain control. Bifurcated, meaning that the flex of each plate-spring is divided into two equal but opposite flexing radii as the plate-springs are flexed into the shape of a serpentine. Strain Control is achieved by strain-control cams, mounted adjacent to the plate-springs rigid mounting lines, to progressively support loads placed on the spring system and distribute the strain over the length of the plate-springs. In the said bifurcated spring systems, perpendicularly spaced or stacked flat plate-springs, under load, inherently flex into the shape of a serpentine with two equal but opposing radii. Flex-shear movement between plate-spring layers of the first radius is canceled by the opposing flex-shear movement in the second and opposing radius, resulting in equalization of shear to occur within the length of the two radii of the serpentine. With the shear movement equalized within the serpentine, the not flexed ends of these stacked plate-springs can be rigidly mounted to the un-sprung portion of a mass on one end, and to the sprung portion of the said mass on the opposite end.

Strain control cams or surfaces, mounted perpendicular, adjacent to the rigid mounting line, and spaced progressively apart from the plate-spring planes, control the strain exerted on the plate-springs under load, by distributing the load induced strain over the full length of each plate-spring controlled by the location and shape of the said cam.

The said plate-springs, being rigidly mounted on two ends, are flexible in a direction perpendicular to the surface of the plate-springs, but rigid in parallel directions to the said plate-springs. Thus, under load, the plate-springs flex, bifurcated, into a serpentine shape, inherently providing for a constrained unidirectional suspension travel path.

This invention further teaches a progressive spring rate. Strain control cams are mounted adjacent to the rigid mounting line, perpendicular and spaced progressively apart from the plate-spring surface, in such a way that, under a progressive load, said strain-control cams come progressively in contact with the plate-springs, and progressively support a portion of the load. Spring rate and the progression of the spring rate are thus determined by the position and shape of the said strain-control cams. The limiting of the deflection and thus the strain in the plate-springs, by the strain-control cams, inherently provides for a progressive spring rate.

This invention further teaches an adjustable, variably progressive, spring rate. This is achieved by providing a mechanism to change the relative positions and, or, the contours of the said strain-control cams. Varying the position and, or, contour of the said cams, varies the proportion of load the strain-control cams carry, which, in turn, varies the spring rate and spring rate progression.

This invention further teaches of an active adaptive spring rate control. This is achieved by outfitting the bifurcated spring system with sensors in communication with a control module. The said module converts input from sensors into a positioning command. The positioning command actuates a strain-control cam positioning mechanism, changing the relative positions and, or, contours of the said strain-control cams, and thus actively adapting the spring rate and spring rate progression of the spring system.

DETAILED DESCRIPTION OF THE INVENTION

Figure 1:
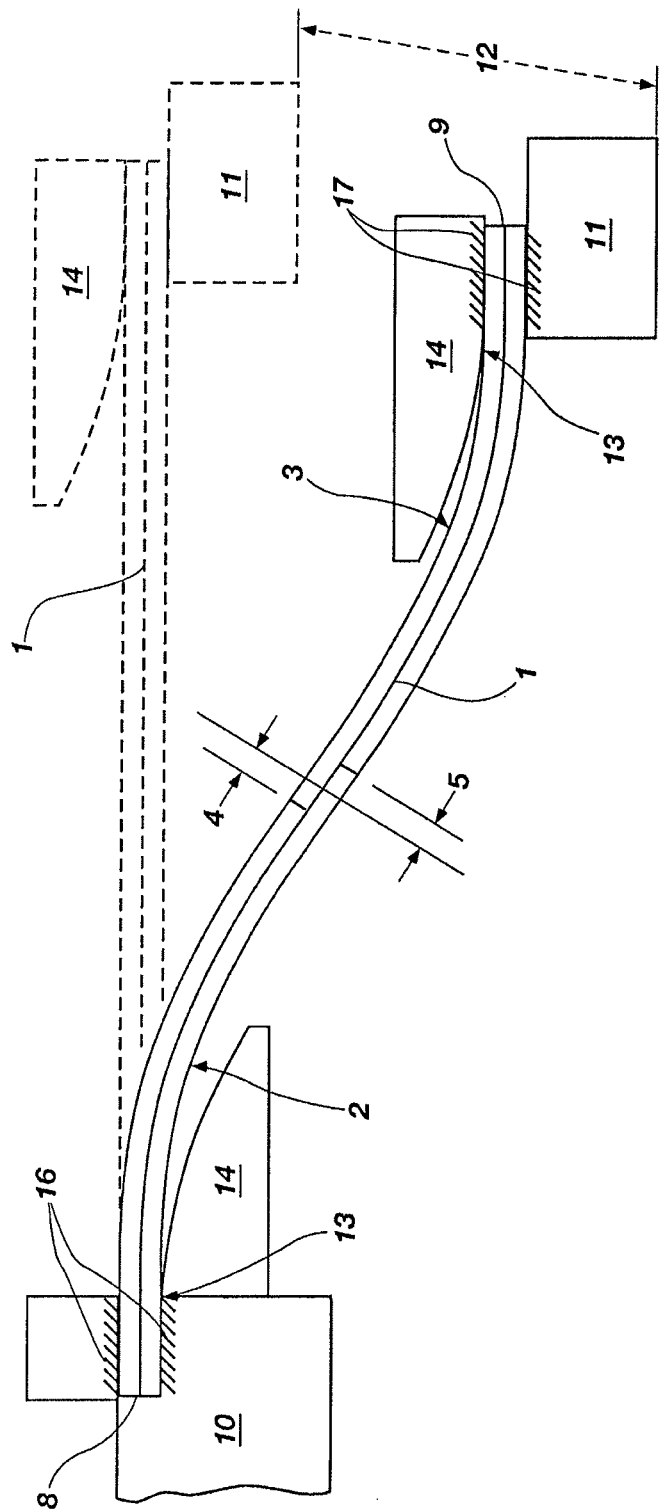
FIG. 1. A diagram showing the basic principle of a bifurcated spring system with its strain-control cam or surfaces, showing zero load (doted lines) and a load (solid lines).

It is the objective of this invention to provide a simple, flat plate-spring suspension system, with a constrained unidirectional suspension travel path, progressive spring rate, adjustable spring rate, and adaptive spring rate control. This objective is achieved by a bifurcated spring system of plate-springs, coupled with fixed or movable strain-control cams.

Flexing members of the spring system are made of flat wide plates of any type of resilient spring material referred to as plate-springs (1). The bifurcated spring system plate-springs (1), under load, flex into the shape of a serpentine of two separate and opposing radii (2 and 3). Shearing action (4 and 5) between plate-springs under load, are of opposing directions and are canceled within the two opposing radii (2 and 3). No shear action is propagated beyond the two opposing radii (2 and 3), allowing for rigid mounting of the plate-springs (1) on two opposing ends (8 and 9), with the first end mounted rigidly to the un-sprung portion of a mass (10) and the opposing end, rigidly mounted to the sprung portion of a mass (11).

With the ends mounted rigidly, the spring system inherently travels in a constrained, unidirectional path (12).

This invention further teaches that undesirable stress concentrations most dominant at each rigid mounting line (13) are eliminated by the use of strain control surfaces, or cams, (15 and 14) mounted adjacent to the mounting area (13), perpendicular, and spaced progressively apart from the plate-springs (1). Strain-control surfaces, or cams (14), mounted adjacent to the negative travel side of the said plate-springs (1), determine the strain distribution and thus the spring-rate in the negative flex direction, while strain-control cams (15), mounted adjacent to the opposite surface of the said plate-springs, determine the strain distribution and thus the spring-rate for the positive flex direction of the plate-springs.

This invention further teaches an adjustable, variably progressive, spring rate. This is achieved by providing movable strain-control surfaces (18), which change the relative contact positions between the plate-spring (1) and the strain-control surfaces (18). Varying the position and or contour of said strain-control cam segment (18), varies the proportion of load the support surfaces carry, which in turn varies the spring rate and spring rate progression.

This invention further teaches an active adaptive spring rate control. This is achieved by outfitting the bifurcated spring system (FIG. 2) with sensors (19) in communication with a control module (20). The said module (20) converts input from sensors (19) into a positioning command. The positioning command actuates a support cam positioning mechanism (21), which changes the relative positions and, or contours of said strain-control surfaces (18), thus actively changing the spring rate and spring rate progression of the spring system.

Figure 2:
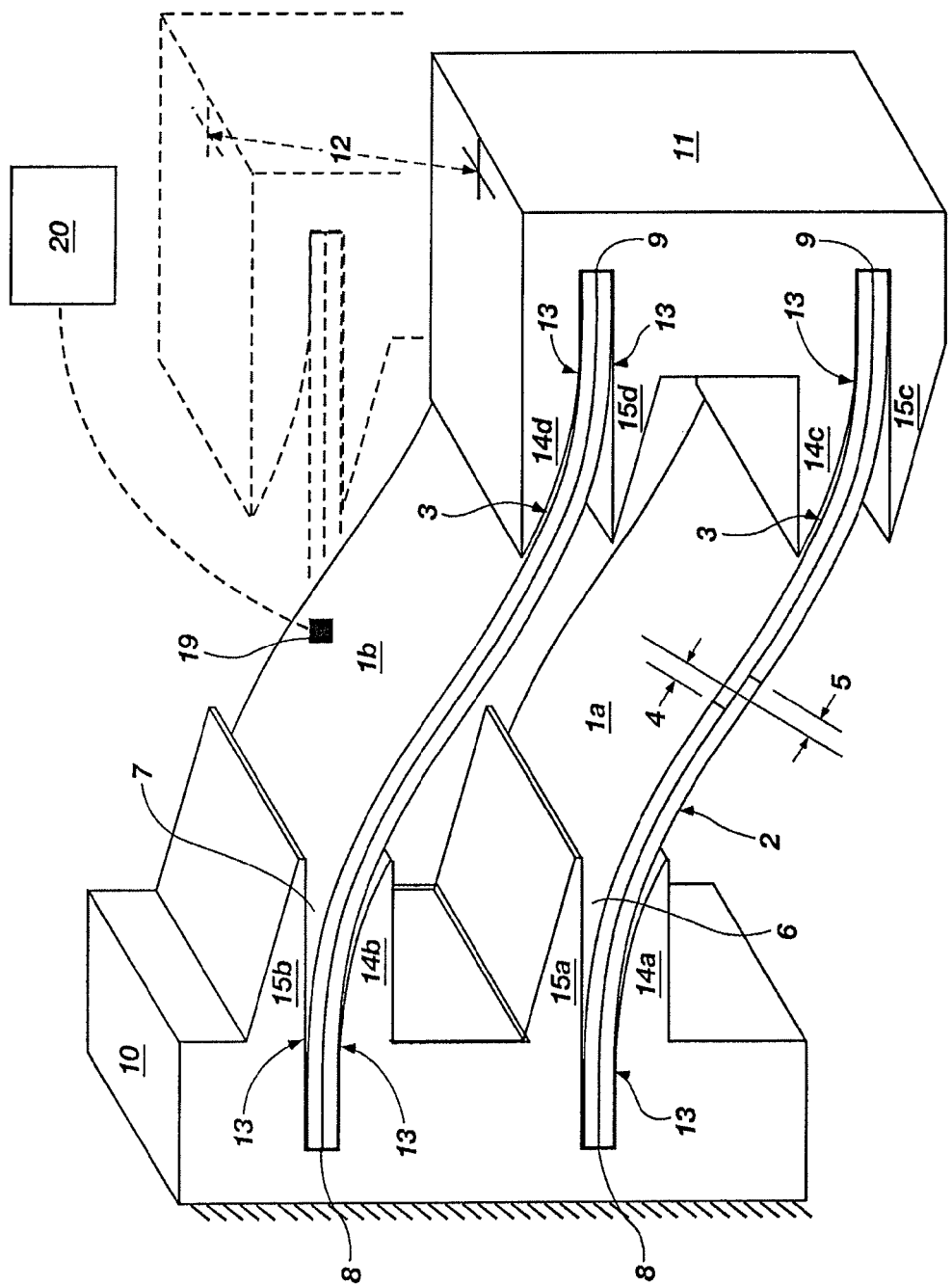
FIG. 2. A perspective view of a form of the bifurcated spring system, with two set of plate-springs, mounted perpendicularly apart, with fixed strain-control cam surfaces mounted adjacent to the mounting area, perpendicular and progressively apart from said plate-springs, showing the spring systems inherent shear equalizing serpentine shape of two equal opposing flex radii and the inherent unidirectional travel path. (Shown under load with solid lines, but indicating zero load position with doted lines.)

With specific reference to FIG. 2, a first plate spring (1b) is disposed between unsprung mass (10) and sprung mass (11). A second plate spring (1a) is also disposed between unsprung mass (10) and sprung mass (11) and above the first plate spring (1b). A first cam (15b) is disposed on a top surface (7) of the first plate spring (1b) and a second cam (15a) is disposed on a top surface (6) of the second plate spring (1a). A third cam (15d) is disposed about a bottom surface of the first plate spring (1b). A fourth cam (15c) is disposed about a bottom surface of the second plate spring (1a). A fifth cam (14a) is disposed about the bottom surface of the second plate spring (1a). A sixth cam (14b) is disposed about the bottom surface of the first plate spring (1b). A seventh cam (14c) is disposed about a top surface (7) of the first plate spring (1b). Finally, an eighth cam (14d) is disposed about a top surface (6) of the second plate spring (1a).

Figure 3:
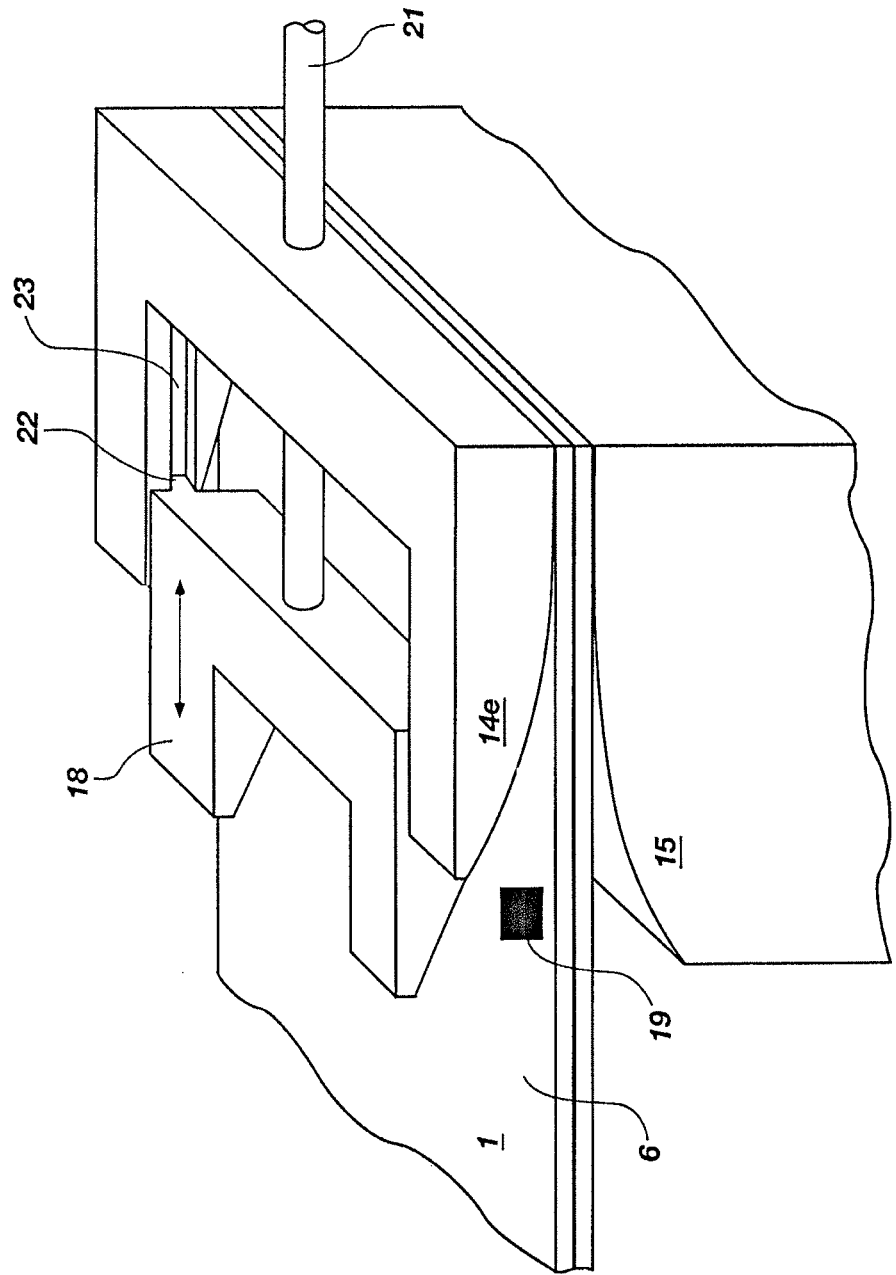
FIG. 3. A perspective view of one example of a movable and adjustable strain-control cam.

With specific reference to FIG. 3, cam (14) comprises a moveable portion (18) and a non-movable portion (14e). Moveable portion (18) comprises a tab member (22) configured to mate with groove (23) of the non-moveable portion (14e) of cam (14).

The invention claimed is:

1. A spring system with a strain control device, comprising:
   a substantially flat plate spring having first and second ends, the flat plate spring being rigidly mounted to a first base at the first end and rigidly mounted to a second base at the second end, wherein the second base is configured to move relative the first base;
   a first adjustable cam member disposed about the plate spring near the first end; and
   a second adjustable cam member disposed about the plate spring near the second end, wherein the first adjustable cam member and the second adjustable cam members are disposed about opposing sides of the plate spring, wherein one of the first or second adjustable cam members comprises a curved surface having a variable radius of curvature.

2. The spring system of claim 1, wherein at least one of the first and second adjustable cam members comprises a fixed portion and a moveable portion.

3. The spring system of claim 1, wherein at least one of the first and second adjustable cam members comprises a contact surface tapering from tangent to the plate spring progressively away from the plate spring.

4. The spring system of claim 1, wherein the first and second adjustable cam members comprise a curved surface with a variable radius of curvature disposed adjacent the plate spring member.

5. The spring system of claim 4, wherein the first adjustable cam member and the second adjustable cam member have an equal radius of curvature.

6. The spring system of claim 1, wherein the first and second cam members are oriented such that the plate spring flexes into a serpentine shape when a load is placed on the second base.

7. The spring system of claim 1, wherein the first cam member is disposed on a top surface of the plate spring and the second cam member is disposed on a bottom surface of the plate spring.

8. The spring system of claim 1, wherein the first cam member is disposed on a bottom surface of the plate spring and the second cam member is disposed on a top surface of the plate spring.

9. The spring system of claim 1, wherein at least one of the first and second cam members is horizontally adjustable.

10. The spring system of claim 1, wherein the contour of at least one of the first and second cam members is adjustable.

11. A spring system with a strain control device, comprising:
    a plate spring having first and second ends, the plate spring being mounted to a first base at the first end and mounted to a second base at the second end, wherein the second base is configured to move relative the first base;
    an adjustable cam member disposed about the plate spring, wherein the adjustable cam member comprises a moveable member and a stationary member;
    a control module adapted to adjust the position of the cam member in response to strain put on the plate spring; and
    a sensor in communication with a control module, the sensor adapted to measure strain on the plate spring and communicate said strain to the control module.

12. The spring system of claim 11, wherein the moveable member is disposed within the stationary member.

13. The spring system of claim 11, where the moveable member comprises a tab disposed within a groove of the stationary member.

14. A strain controlled spring system, comprising:
    a plate spring having first and second ends, the plate spring being mounted to a base at the first end, wherein the second end is configured to move relative the first end;
    an adjustable cam member disposed about the plate spring, wherein the cam member comprises a curved surface having a variable radius of curvature;
    means for measuring the strain of the plate spring and sending a signal corresponding to the measured strain; and
    means for adjusting the position of the cam member in response to the signal corresponding to the measured strain.

15. A strain controlled spring system, comprising:
    at least two plate springs having first and second ends, the plate springs being mounted to a first base at the first end and mounted to a second base at the second end, wherein the second base is configured to move relative the first base, wherein the at least two plate springs are oriented parallel to one another; and
    a first set of cam members disposed about the plate springs adapted to control the strain induced on the at least two plate springs when the second base is moved in a first direction;
    a second set of cam members disposed about the plate springs adapted to control the strain induced on the at least two plate spring members when the second base is moved in a second direction,
    wherein the first and second set of cam members comprise a curved contact surface at least one of which has a variable radius of curvature.

16. The strain controlled spring system of claim 15, wherein the radius of curvature of the first and second set of cam members is a variable radius of curvature.

17. The strain controlled spring system of claim 15, wherein the first set of cam members comprise cam members disposed beneath the plate springs near the first end of the plate springs and cam members disposed above the plate springs near the second end of the plate springs.

18. The strain controlled spring system of claim 15, wherein the second set of cam members comprise cam members disposed above the plate springs near the first end of the plate springs and cam members disposed beneath the plate springs near the second end of the plate springs.

19. The strain controlled spring system of claim 15, wherein the at least one of the cam members is horizontally adjustable.

20. The strain controlled spring system of claim 15, wherein the contour of at least one of the cam members is adjustable.

21. A method of controlling strain on a spring system, comprising:

(a) providing a spring system comprising:
    a plate spring having first and second ends, wherein the second end is configured to move relative the first end;
    an adjustable cam member disposed about the plate spring, wherein the adjustable cam member comprises a stationary member having a curved surface and a moveable member having a curved surface, said moveable member disposed within the stationary member and wherein the curved surface of the stationary member is substantially similar to the curved surface of the moveable member; and
    a sensor adapted to measure strain on the plate spring;
    a cam member adjustment device;

(b) measuring the strain of the plate spring;

(c) adjusting the position of the cam member in response to said strain.

22. The method of claim 21, wherein the spring system further comprises a control module adapted to receive a signal from the sensor and communicate said signal to the cam member adjustment device.

\* \* \* \* \*